United States Patent [19]
McCoy et al.

[11] Patent Number: 5,249,663
[45] Date of Patent: Oct. 5, 1993

[54] APPARATUS TO LOAD WORKPIECES

[75] Inventors: Gary W. McCoy, Evans City; John Zwigart, New Brighton; Mark R. Tweedy, Valencia, all of Pa.

[73] Assignee: Carl Strutz and Company, Inc., Mars, Pa.

[21] Appl. No.: 771,638

[22] Filed: Oct. 4, 1991

[51] Int. Cl.⁵ .............................................. B65G 25/00
[52] U.S. Cl. ............................. 198/468.2; 74/479 R; 198/409; 198/375; 414/226; 414/730; 414/740
[58] Field of Search ............... 414/226, 225, 729, 730, 414/740; 74/479, 54; 198/375, 409, 468.2

[56] References Cited

U.S. PATENT DOCUMENTS

| | | | |
|---|---|---|---|
| 1,276,898 | 8/1918 | Gallup et al. | 198/409 X |
| 1,740,575 | 12/1929 | Clausen et al. | 198/468.2 X |
| 1,786,608 | 12/1930 | Halstead | 198/468.2 X |
| 4,273,507 | 6/1981 | Herdzina et al. | 414/226 X |

Primary Examiner—Michael S. Huppert
Assistant Examiner—Donald W. Underwood
Attorney, Agent, or Firm—Clifford A. Poff

[57] ABSTRACT

Apparatus to load workpieces on a carrier for a decorator. A swing arm supports grippers at one end for movement between a workpiece transfer site and a workpiece loading position. An actuating lever moveable with the swing arm moves a gripper into a workpiece gripping position with the stationary gripper at the transfer site and moves the displaceable gripper into a workpiece release position with stationary gripper at the workpiece loading position. A driven cam track coupled by a follower to an oscillating shaft reciprocates the swing arm between a workpiece receiving position and a workpiece discharge position. A belt extends between a bearing block used to support the oscillating shaft and a support shaft for the gripper so that as the swing arm reciprocates the gripper is rotated to transposes the position of the workpiece supported thereby.

18 Claims, 8 Drawing Sheets

APPARATUS TO LOAD WORKPIECES

BACKGROUND OF THE INVENTION

1. Field of the Invention

This invention relates to loading workpieces supplied by a transport device to a designated pick-up site for presentation to a processing device such as a decorating facility. More particularly the present invention relates to an apparatus wherein a workpiece such as a glass vessel is manipulated from a supply conveyor with an initial lifting motion out of supporting contact therewith and concluding with delivery motion to the carrier in which the workpiece has been reorientated for disposition o the carrier suitable for carrying-out the processing operation, such as decorating.

2. Description of the Prior Art

As shown in U.S. Pat. Nos. 2,231,535; 2,261,255; 2,721,516; and 3,146,705 intermittent motion type decorating machines are known in the art and provide a drive system to impart intermittent traveling motion to the workpieces such as containers made of glass or plastic. A container is moved through a predetermined distance, stopped, moved again through a predetermined distance, stopped and again moved until each container through the sequence of motions moves completely through the decorating machine. A decorating station will be provided at each place where the container comes to a stop. At the decorating station a decorating screen is displaced into line contact with the surface of the container by an associate squeegee and then the container is rotated and the squeegee remains stationary for a decorating process. It is advantageous for this decorating process to provide that the container surface which is to receive the decoration is horizontally oriented. This is because the printing medium is subject to the influence of gravity whereby the printing medium can be uniformly spread across the screen surface when the squeegee moves horizontal. When the squeegee surface, for example, is orientated vertically, the ink or other printing medium is difficult to maintain uniformly throughout the height of the printing screen. The advantages of decorating the workpiece while the workpiece is orientated horizontally is equally applicable to other examples of workpieces such as glass tumblers where, for example, it is possible to grip the workpiece at one end only. With respect to a soda bottle, for example, the bottle mouth, forming the support site, is too small to sustain the weight of the bottle by a vacuum chuck. Therefore, it is necessary to engage opposite ends of the soda bottle for adequate support.

There are, however, machines known in the art for applying decoration to a surface while orientated vertically. An example of such a machine is disclosed in U.S. Pat. No. 4,463,371. The present invention seeks to provide a workpiece load device that can supply workpieces at spaced apart time intervals in a reliable fashion to a support structure used to bring a workpiece to a decorating station. In this regard, it is necessary to provide a manipulative structure suitable to receive a supply of workpieces from one conveyance structure and present these workpieces in succession to a second support structure in which the manner of support, when desired, can be diversed. For example, workpieces can be presented to the feed device with the surface to receive the decoration orientated vertically and transposed by the feed device to a horizontal orientation. This is a typical and most desirable manner for handling containers since the container occupies a minimum space when supported to extend vertically and then reorientated for the decorating process to extend horizontally. It is, however, within the scope of the present invention to receive workpieces with the workpiece surface to receive decoration orientated horizontally and to maintain that horizontal disposition throughout the loading and decorating processes for the workpiece. Similarly, workpieces having a decorative receiving surface orientated vertical may remain vertical while manipulated by the loading operation whereby the vertical orientation remains during a printing process such as shown in U.S. Pat. No. 4,463,671.

Certain workpieces because of their configuration and material of construction, such as glass tumblers which are tall truncated cones with a bottom, must be moved with great precision from a supply conveyor to a carrier in a decorating machine. Ever changing variables from glass tumbler to a glass tumbler include surface irregularities at the touch sites where the glass tumbler will be supported by the gripping members used to load the workpiece. Also the glass tumbler should move along a path of travel that avoids the possibility of impact with the conveyor structure used to supply the tumbler to the feeding mechanism. Impact must also be avoided with a retention device used to hold the tumbler throughout the decorating process. The avoidance of impact is particularly acute to satisfy necessary operating speeds to achieve an acceptable through-put capacity for the decorating machine. Operator fatigue precludes use of workers to feed workpieces, such as glass tumblers, to a decorating machine. Moreover, in a decorating machine using silk-screen printing techniques, after the screens are provided with an ink supply, the printing operations should proceed without extended periods of interruption. Printing delays due to down time of allied equipment allow an unwanted dispersement of printing medium through the silk-screen without extraction of the printing medium from screen by a workpiece. The matter is particularly acute when, for example, multiple colors are printed using multiple printing stations. When four different colors are being printed in a single decorating machine, each of the four different printing stations for the various colors must be subject to a clean-up operation before the decorating machine can be placed back on a production basis. Restarting the printing operation after a delay requires cleaning smeared printing from workpieces which is very labor intensive.

SUMMARY OF THE INVENTION

It is an object of the present invention to provide an improved apparatus to load workpieces on a carrier for a decorating process which overcomes the disadvantages described above.

More particularly according to the present invention there is provided an apparatus to load workpieces on a carrier for a decorator, the apparatus including the combination of means for conveying a workpiece to a transfer site, gripper means including a displaceable gripper movable relative to a stationary gripper for supporting a workpiece at the discharge site, a swing arm supporting the gripper means at one end thereof for movement between the workpiece transfer site and a workpiece loading position, means including an actuating lever moveable with the swing arm for moving the displaceable gripper into a workpiece gripping position with the stationary gripper at the transfer site and for moving the displaceable gripper into a workpiece release position with the stationary gripper at said workpiece loading position, means joined to the end of the swing arm opposite said gripper means for reciprocating said swing arm between a workpiece receiving position and a workpiece discharge position, and means to synchronize by a timed relation the operation of the means for reciprocating and the means for moving.

BRIEF DESCRIPTION OF THE DRAWINGS

These features and advantages of the present invention as well as others will be more fully understood when the following description is read in light of the accompanying drawings in which.

DETAILED DESCRIPTION OF THE PREFERRED EMBODIMENT

Figure 1:
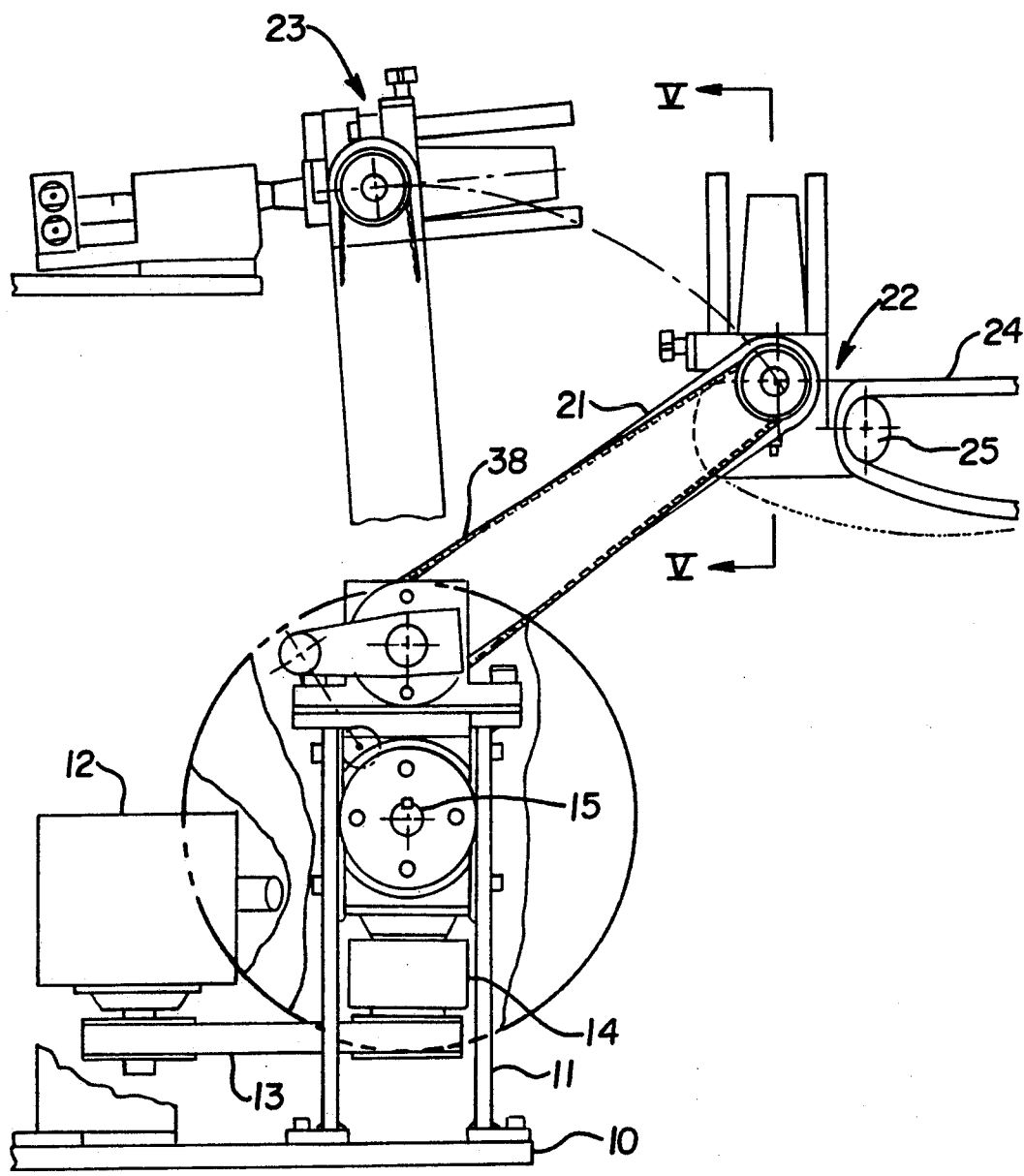
FIG. 1 is a elevational view of a loader apparatus embodying the features of the present invention.
Figure 2:
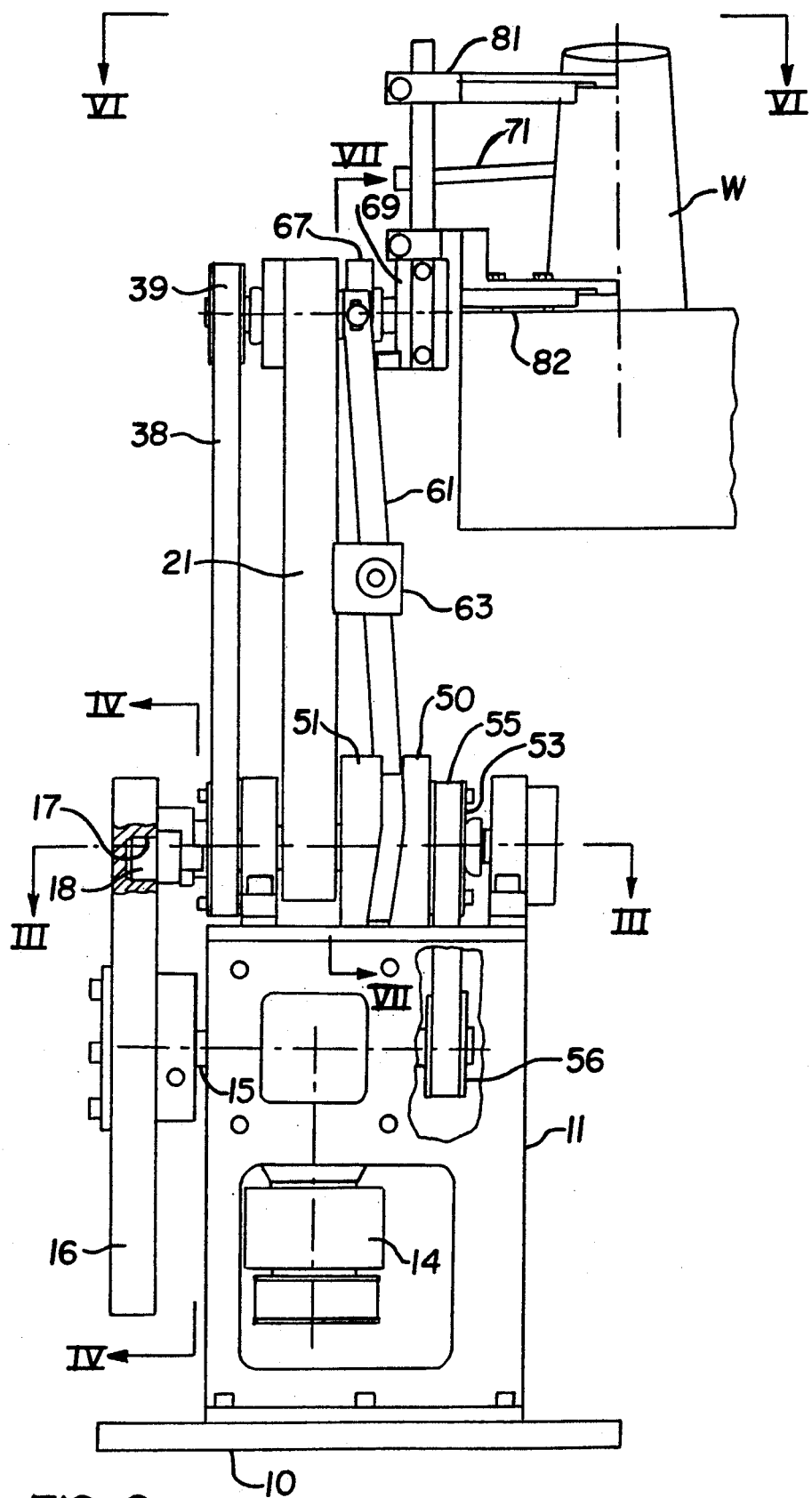
FIG. 2 is a side elevational view of a loader apparatus shown in FIG. 1.
Figure 4:
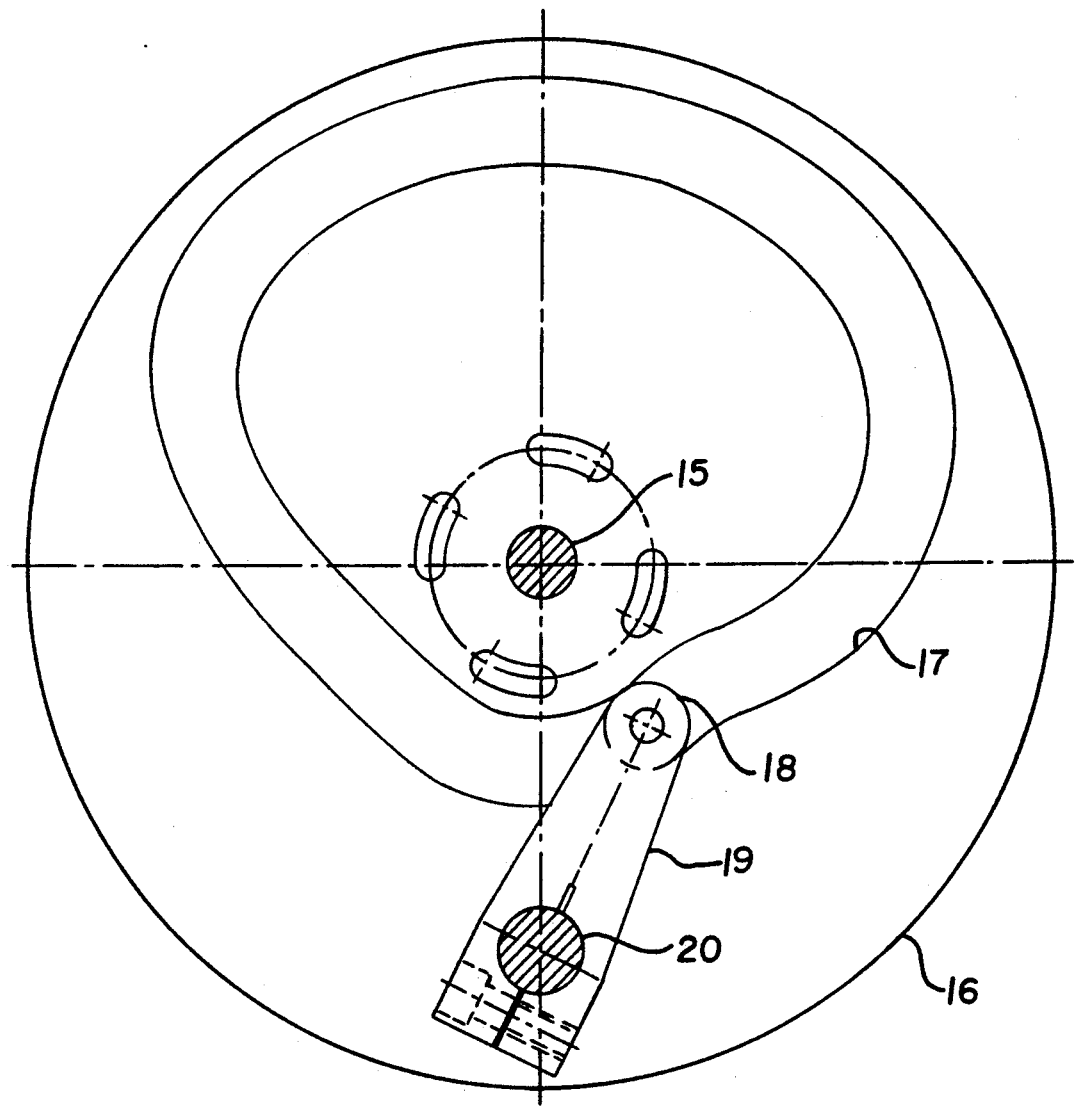
FIG. 4 is a sectional view taken along line IV—IV of FIG. 2.

Turning now to FIGS. 1 and 2 of the drawings, there is illustrated a foundation base 10 on which there is supported a drive housing 11. The housing 11 includes a carrier frame for a drive motor 12 having a drive output shaft to which a pulley is secured and connected by a belt 13 to a pulley of an input shaft to a gear reducer 14. The gear reducer performs a speed reduction function for the rotary input motion by the motor and provides diverse output shafts, one of which is ar output shaft 15 that is connected by a hub to circular plate member 16 having on a face surface thereof a cam track 17. As shown in FIG. 4, the cam 17 track is a cavity formed in the face of plate 16. The cam track is designed to create a reciprocating motion that is transferred by a cam follower 18 to a pivot arm 19. Arm 19 reciprocates while rigidly connected to a drive input end of an oscillator shaft 20. The configuration of the cam track 17 imparts to the arm 19, a to-and-fro motion that is predetermined according to the configuration of the ca track to reciprocate a swing arm 21 through a desired angular displacement starting, at one extreme, with a workpiece transfer site 22 and terminating at the other extreme at a workpiece loading position 23. The workpiece transfer site is established by a predetermined area on a conveyor belt 24 that is supported by a roller 25 to form a return run of the belt. Belt 24 and roller 25 form part of an endless conveyor system per se well known in the art. The workpieces may assume a predetermined spaced apart relation on the conveyor by a spacing device, per se, well known in the art. For the purpose of describing the preferred embodiment of the present invention, the configuration of the workpiece will be assumed to be a glass tumbler of the type commonly used domestically and frequently provided with a decorative coating about the outer surface of the glassware. The decorative indica is applied by a suitable silkscreen apparatus. It is important that as glassware is delivered to the loading position 23 it is immediately brought into the support relation with an annular rim forming part of a vacuum chuck 26.

Figure 8:
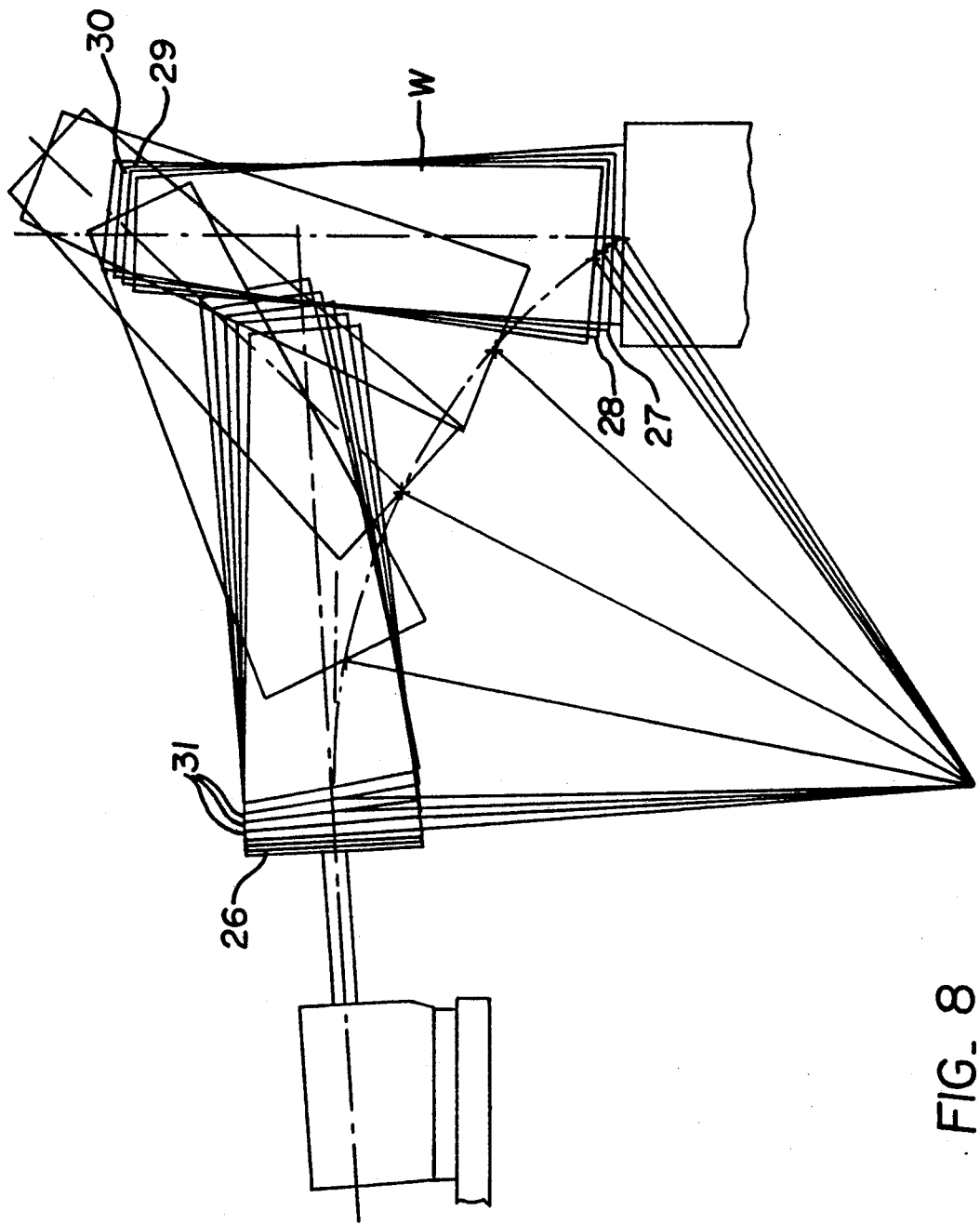
FIG. 8 is an illustration of the workpiece positions in a transfer sequence from a vertical orientation to a horizontal orientation.

As will be more fully understood, the apparatus of the present invention operates to bring about a transfer motion for a workpiece in the preferred embodiment of the present invention as illustrated in FIG. 8. It can be seen that the workpiece W at the workpiece transfer site 22 is carried on the conveyor in the most stable position by a vertical orientation. In this position the glass tumbler is supported by the maximum diameter rim section on the conveyor. The tumbler is brought into a supporting engagement with the swing arm and through operation of the swing arm immediately lifted out of touching contact with the conveyor belt. The lifting motion is such that there is a leading edge to the traversing movement of the tumbler caused by the swing motion of the swing arm. Thus it can be seen from FIG. 8 that a leading edge portion of the workpiece W attains an original position identified by reference numeral 27. At a first instance when moved out of contact with the conveyor belt, the leading edge advances to a elevated and transposed to a position identified by reference numeral 28 by the initial increment of motion. The advancing movement of the leading edge 28 is accompanied by a retreating motion of the upper end of the glass tumbler as can be seen by comparing the positions of the upper end, identified by reference numeral 29 with a repositioned portion identified by reference numeral 30. As the swing arm continues pivotal movement from the transfer site to the workpiece loading position, the tumbler which is in the form of a truncated cone, quickly assumes through the action of the apparatus of the present invention a near horizontal orientation. The last concluding increments of motion of the workpiece comprise incremental advancements toward the vacuum chuck 26 through distances that are approximately equal and identified in FIG. 8 by reference numeral 31. As the workpiece is advanced through each distance 31 there is an attendant, shall but perceptible, final orientation of the workpiece into a final desired horizontal arrangement.

All of the motion imparted to the workpiece for the transfer operation, according to the present invention, is derived from the single rotary source of movement provided by the drive motor 12. As can be best seen in FIG. 3, the swing arm 21 is rigidly attached to the oscillating shaft 20 adjacent to a bearing block 32 that is supported by a base 33 upon the drive housing 11.

Figure 5:
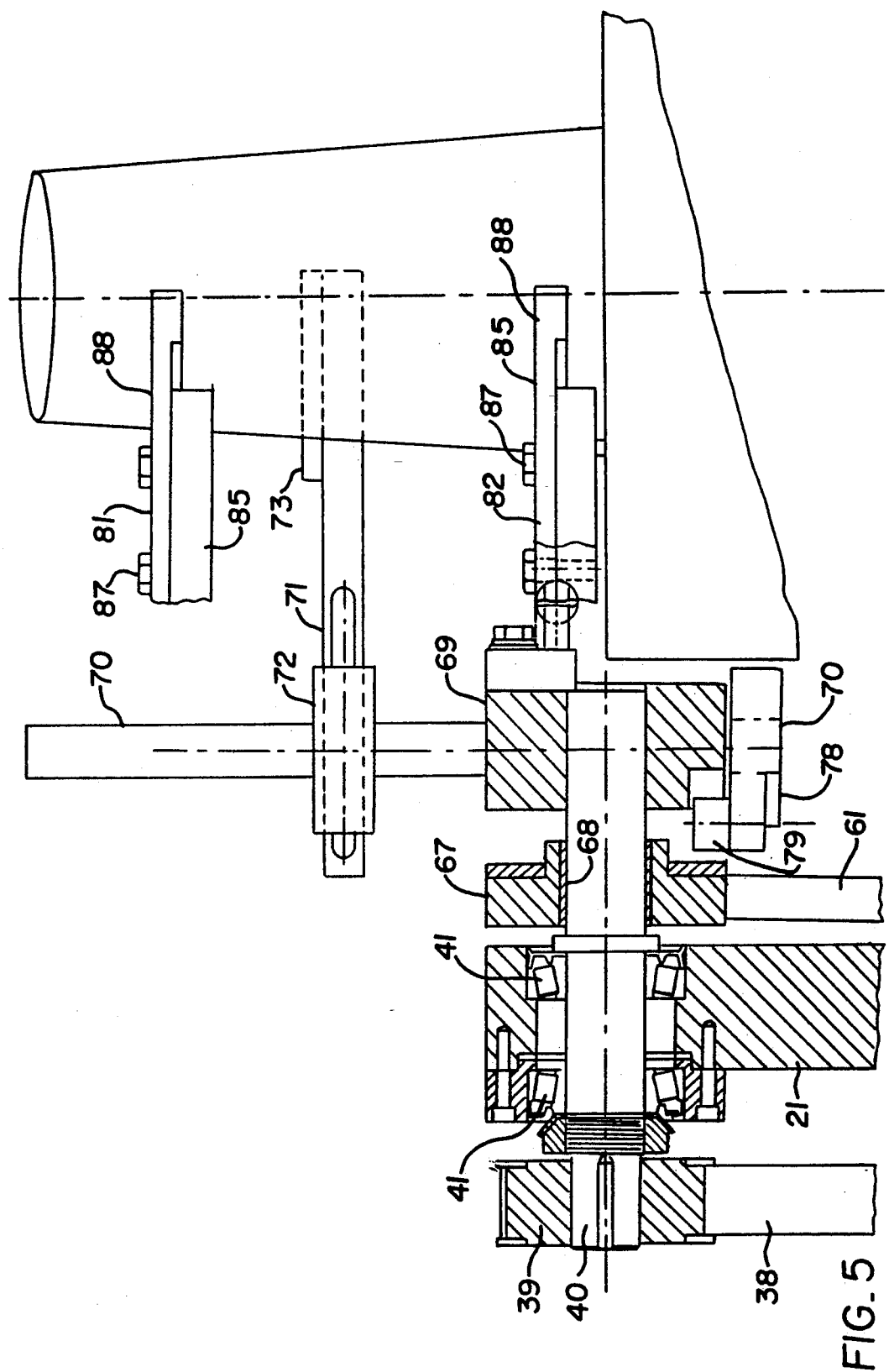
FIG. 5 is a sectional view taken along lines V—V of FIG. 1.

Within the cavity of the bearing block 32 there is a recessed opening forming a shoulder against which an anti-friction bearing 34 is supported and held in place by a cap assembly 35. The cap 35 is secured by fasteners 36 to the bearing block. The outer peripheral surface of the bearing cap 35 is machined to form a sheave surface 37 about which there is trained an endless belt 38. The belt extends in a generally parallel relation with the swing arm 21 to the upper end of the swing arm where the belt is entrained about a pulley 39 (FIG. 2). Pulley 39 is secured by a set screw or other suitable fastener to a shaft 40 as best shown in FIG. 5. The shaft 40 is supported by spaced apart anti-friction bearings 41 that are mounted on the shaft and received in counter bore openings formed in the upper end portion of swing arm 21. It can be seen that as the swing arm 21 is moved to-and-fro through the operation of the cam track 17, the belt 38 is constrained against relative movement about shaft 21 by reason of engagement with the sheave surface 37. However, even though the belt 38 may not move in the direction of its endless length, it is nevertheless caused to impart a reciprocating rotary type motion to shaft 40 corresponding to the swinging motion imparted to the swing arm 21.

Figure 3:
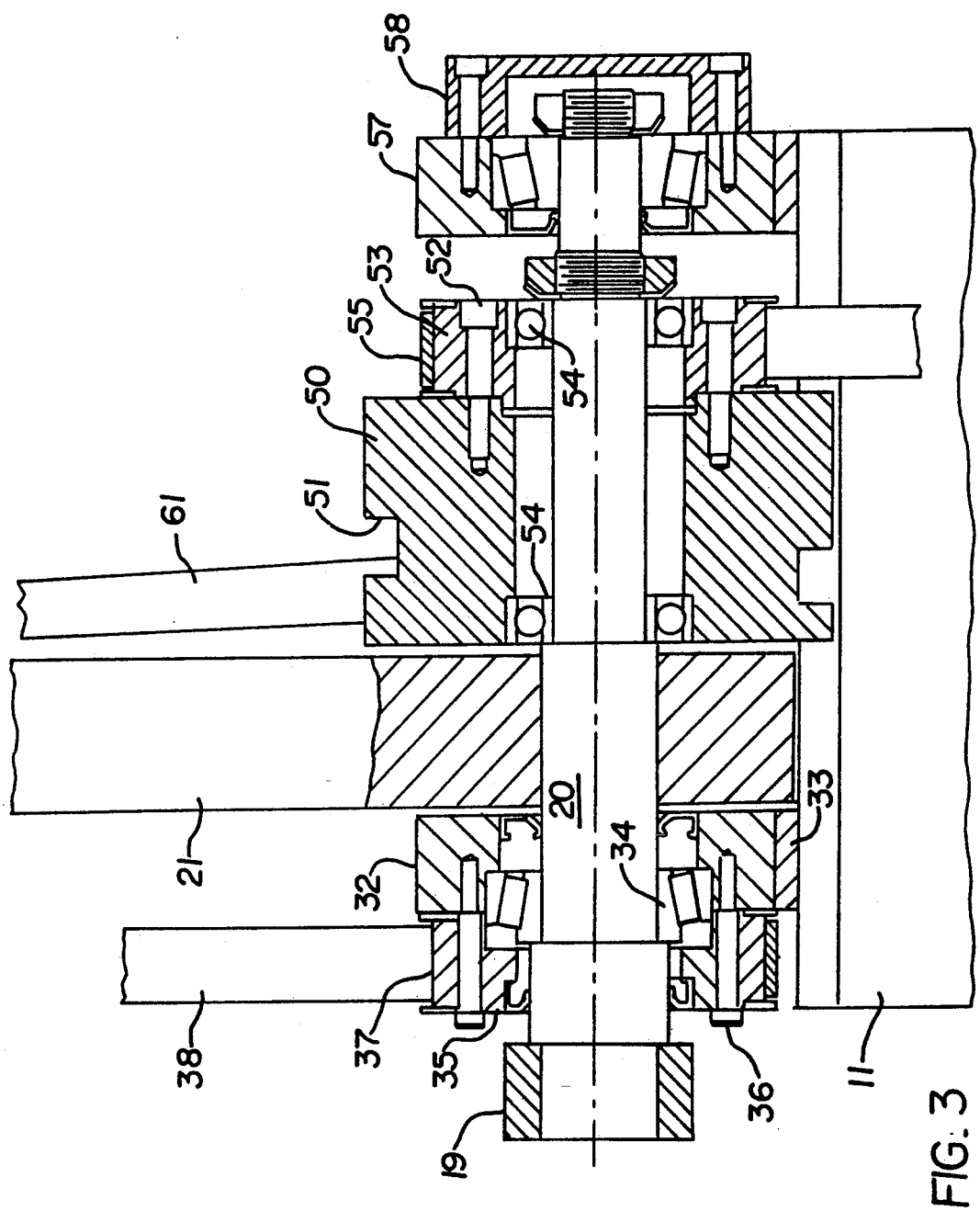
FIG. 3 is a sectional view taken along lines III—III of FIG. 2.

At the side of the swing arm 21 which is opposite to bearing block 32, as shown in FIG. 3, there is rotatable supported on shaft 20 a cylindrical member 50 having cut into its cylindrical surface a recess defining a cam surface 51. The roller 50 is connected by fasteners 52 to a pulley 53. The roller 50 and pulley 53 are supported for independent rotary movement by anti-friction bearings 54. Pulley 53 receives an endless belt 55 that extends downwardly, as shown in FIG. 2, about a pulley 56 that is mounted to an extension cf shaft 15.

The end of shaft 20 which is outboard of the pulley 53 is supported by an anti-friction bearing in a bearing block 57 that is, in turn, supported on the drive housing 11. End cap 58 is removably attached to the bearing block 57.

Figure 7:
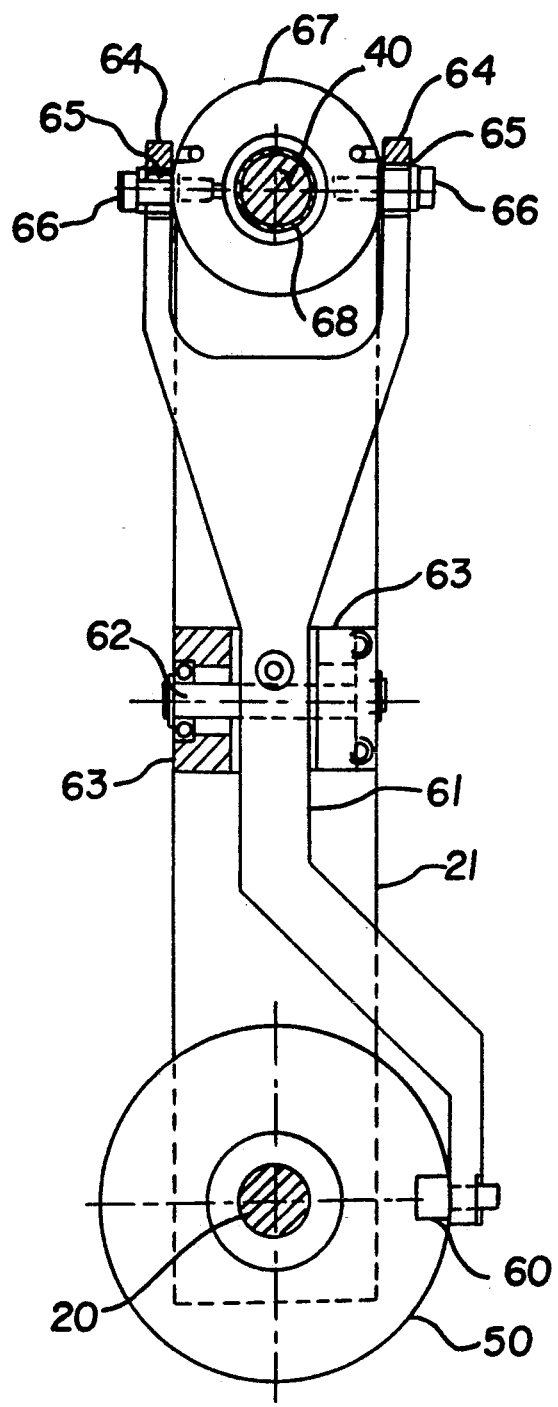
FIG. 7 is a sectional view taken along lines VII—VII of FIG. 2.

As can be seen from FIGS. 2 and 7, cam track 51 receives a follower roller 60 which is carried on one end of a pivot lever 61. Lever 61 is formed with a bore opening in its mid-part to receive a pivot shaft 62 that is in turn supported at its opposite ends by bearings in bearing blocks 63. The bearing blocks 63 are attached by fasteners to the sidewall surface of swing arm 21. The free end of pivot lever 61 has an end portion with spaced apart forks 64. Each fork has a slotted opening into which there is received a bearing 65 that is secured by a fastener 66 at diametrically opposite sites to a actuator collar 67. The collar 67 is supported by a sleeve bearing 68 on shaft 40 as best shown in FIG. 5. As belt 55 imparts a driven rotary motion to roller 50, the follower 61 is displaced by the configuration of cam track 51 so that pivot lever 61 will rock back and forth about pivot shaft 62 in a timed relation with rotation of shaft 20 by virtue of the fact that the sam rotary motion is supplied by shaft 15 via the cam surfaces 17 and 51. This swinging motion of the pivot lever 61 moves the actuator collar toward and away from gripper support block 69. As best shown in FIG. 5, the gripper block is rigidly attached to shaft 40 and depending from the bottom surface of the gripper block is a pivot shaft 70. Shaft 70 extends through the gripper block and protrudes from the top of the block where the extended end portion is connected to a support arm 71 by an adjustable clamp strip 72.

Figure 6:
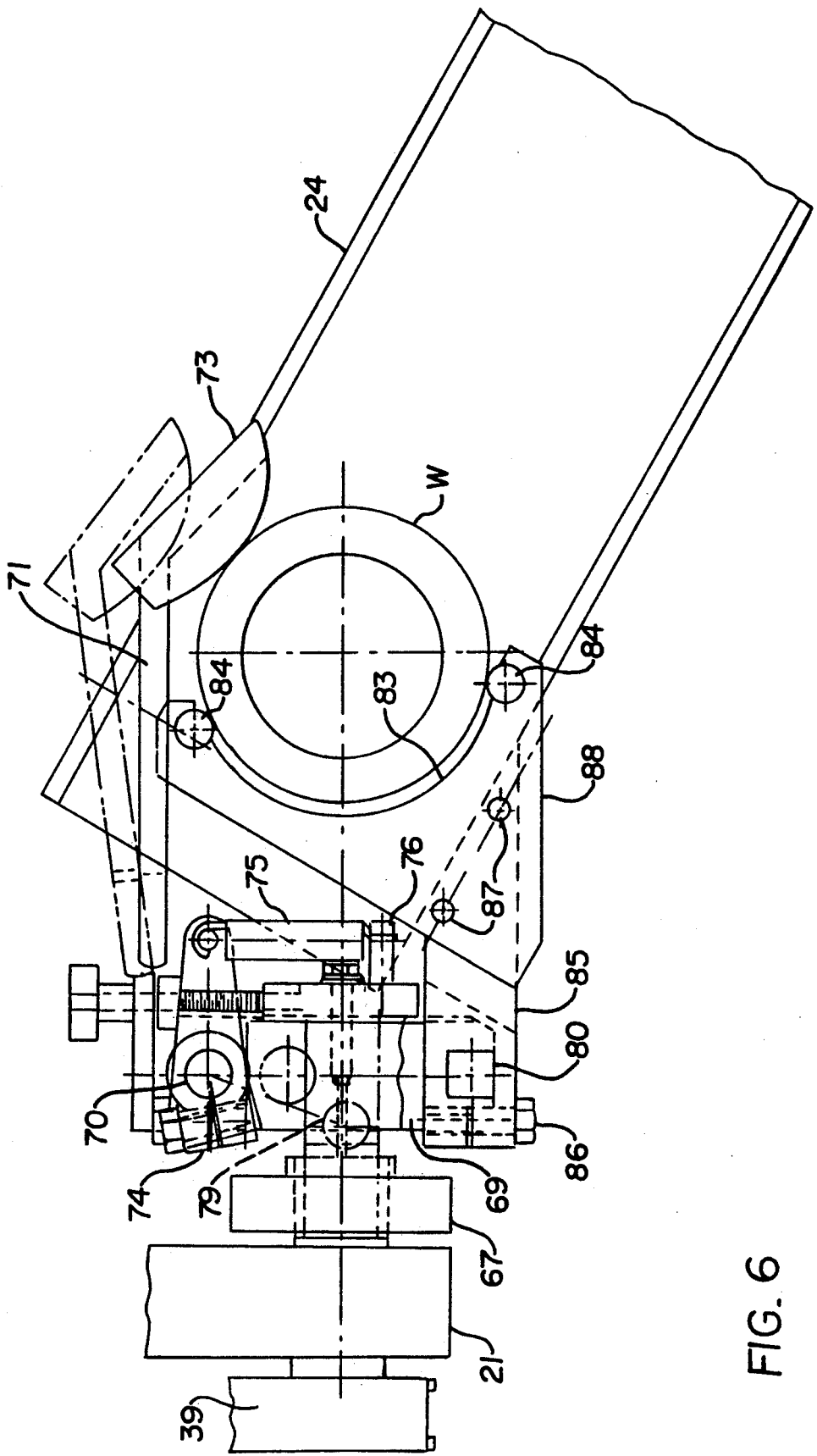
FIG. 6 is a plane view taken along lines VI—VI of FIG. 2.

The free end of support arm 71 receives an arcuately shaped workpiece gripper 73. Support arm 71 is secured by a lever arm 74, as best shown in FIG. 6, to shaft 70. The pivot lever has an extended end portion provided with a connector pin used to support one end of a spring 75 that is stretched to extend to a support post 76 protruding from the gripper block 69. The end portion of the pivot shaft 70 protruding from the gripper block at the bottom thereof is fastened to a bell crank 78 that in turn supports, at its free end, a roller 79 by which the bell crank is operated to rotate shaft 70 when the actuator collar 67 is displaced along the shaft 40 by operation of pivot lever 61. At a side of the gripper block 69 which is opposite shaft 40, there is, rigidly attached to the gripper block, a support post 80. As shown in FIG. 2 and 6, the support post has a square cross-sectional configuration and clamped to the post at spaced apart locations are upper gripper arm 81 and lower gripper arm 82. These arms are stationary with respect to the gripper block and the projected ends form C-shaped cavities 83. The surface defining each of the C-shaped cavities is interrupted at spaced apart locations by circular recesses into which an elastomer rod 84 is received. The elastomer rods impart sufficient resiliency at touch surface sites with workpieces to avoid damage and at the same time accommodate dimensional variations from workpiece to workpiece at the predetermined grip sites. As can be seen from FIG. 5, the upper and lower gripper arms 81 and 82, respectively, each include a gripper rod portion 85 which is clamped by a fastener 86 to the support rod 80. The gripper rod portion in turn supports a plate member 88 which is formed with the C-shaped cavity 83. The plate member is attached by fasteners 87 to the gripper rod portion 85.

In the operation of the transfer apparatus according to the present invention and by referring particularly to FIG. 1, it can be seen that workpieces undergoing a feeding operation from conveyor 24 are initially supported by operation of the moveable gripper arm that contacts the workpiece and applies sufficient pressure to establish a gripping force on the workpiece to retain it against elastomer rods 84. The workpiece is then transferred by a motion as described hereinbefore and illustrated in FIG. 8. It is to be observed that the transfer motion according to the preferred embodiment of the present invention, manipulates the workpiece from a generally vertical orientation at transfer site 22 to a generally horizontal orientation at the workpiece loading position 23. The manipulation of the workpiece in this fashion is caused by the rotary motion imparted to shaft 40 through the operation of belt 38 as the swing arm is moved to the workpiece transfer site. As the swing arm is moved from the transfer site, belt 38 which is prevented from rotation as the swing arm moves causes the shaft 40 to rotate so that the gripper block 69 executes rotation. It will be observed that the rotation of the gripper block and the workpiece supported by the gripper arms thereof occurs with a timed relation with swinging movement of the swing arm 21. This controlled motion is synchronous with the swing arm movement as is the movement of the gripper arm into a gripper position at the transfer site due to the timed relation established by the cam surface 51 for swinging the pivot lever 61.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. Apparatus to load workpieces on a carrier for a decorator, said apparatus including the combination of:
   means for conveying a workpiece to a transfer site;
   gripper means including a displaceable gripper movable relative to a stationary gripper for supporting a workpiece at said transfer site, said gripper means includes a gripper block, a pivot rod supported by said gripper block, a bell crank attached to said pivot rod and responsive to movement by an actuating lever to pivot said pivot rod, and means for connecting said displaceable gripper to said pivot rod;

a swing arm supporting said gripper means at one end thereof for movement between said workpiece transfer site and a workpiece loading position;

means including said actuating lever moveable with said swing arm for moving the displaceable gripper into a workpiece gripping position with the stationary gripper at said transfer site and for moving the displaceable gripper into a workpiece release position with said stationary gripper at said workpiece loading position;

means joined to the end of said swing arm opposite said gripper means for reciprocating said swing arm between a workpiece receiving position and a workpiece discharge position; and means connected between said means for moving and said means for reciprocating for synchronizing by a timed relation the operation of said means for reciprocating and said means for moving.

2. The apparatus according to claim 1 wherein said gripper means includes a support post extending from said gripper block, gripper arms supported by said support post and carrying said stationary gripper.

3. The apparatus according to claim 1 wherein said stationary gripper further includes gripper plates mounted to said gripper arms and having a C-shaped recess into which there protrudes elastomer surfaces forming touch sites for gripping contact with a workpiece.

4. The apparatus according to claim 1 wherein said means for moving the displaceable gripper further includes a cam surface, means for rotating said cam surface, a follower for operating said actuating lever while engaged with said cam surface, means for connecting said actuating lever to said bell crank for actuating said displaceable gripper between support and releasing positions.

5. The apparatus according to claim 1 wherein said means for synchronizing includes a pivot shaft for supporting said actuating lever for pivotal movement on said swing arm whereby said moveable actuating lever pivots while carried by said swinging arm between a workpiece transfer site and a workpiece loading position.

6. The apparatus according to claim 5 wherein said means for moving the displaceable gripper further includes a cam, a follower engageable with said cam while supported by one end of said actuating lever and the opposite end of said actuating lever is coupled to displace said moveable gripper.

7. The apparatus according to claim 1 wherein said means for reciprocating include a cam track, a follower engaged in said cam track and means for connecting said follower to said swing arm.

8. The apparatus according to claim 7 wherein said means for connecting said follower to said swing arm include a pivot arm for supporting said follower and coupled to an oscillator shaft, means for supporting said oscillator shaft for rotary movement.

9. The apparatus according to claim 8 wherein said means for moving includes cam means for controlling said actuating lever while rotatably supported by said oscillator shaft for operating said movable gripper.

10. The apparatus according to claim 1 wherein said swing arm includes means for rotatably supporting said gripper means and wherein the apparatus further includes means coupled to said means for rotatably supporting said gripper means for rotating a workpiece supported by the gripper means from a first orientation to a second orientation while moved by the swing arm between said workpiece transfer site and said workpiece loading position.

11. The apparatus according to claim 10 wherein said means for rotating include a belt extending between said means for rotatably supporting and said means for reciprocating the swing arm for rotating said gripper means while supported by said swing arm.

12. Apparatus to load workpieces on a carrier for a decorator, said apparatus including the combination of:

means for conveying a workpiece to a transfer site;

gripper means including a displaceable gripper movable relative to a stationary gripper for supporting a workpiece at said transfer site;

a swing arm supporting said gripper means at one end thereof for movement between said workpiece transfer site and a workpiece loading position,;

means including an actuating lever moveable with said swing arm for moving the displaceable gripper into a workpiece gripping position with the stationary gripper at said transfer site and for moving the displaceable gripper into a workpiece release position with said stationary gripper at said workpiece loading position, said means for moving the displaceable gripper include a cam surface, means for rotating said cam surface, a follower for operating said actuating lever while engaged with said cam surface, means for connecting said actuating lever to said displaceable gripper for actuating the gripper between support and releasing positions;

means joined to the end of said swing arm opposite said gripper means for reciprocating said swing arm between a workpiece receiving position and a workpiece discharge position; and means connected between said means for moving and said means for reciprocating for synchronous by a timed relation the operation of aid means for reciprocating and said means for moving.

13. Apparatus to load workpieces on a carrier for a decorator, said apparatus including the combination of:

means for conveying a workpiece to a transfer site;

gripper means including a displaceable gripper movable relative to a stationary gripper for supporting a workpiece at said transfer site;

a swing arm supporting said gripper means at one end thereof for movement between said workpiece transfer site and a workpiece loading position;

means including an actuating lever moveable with said swing arm for moving the displaceable gripper into a workpiece gripping position with the stationary gripper at said transfer site and for moving the displaceable gripper into a workpiece release position with said stationary gripper at said workpiece loading position;

means joined to the end of said swing arm opposite said gripper means for reciprocating said swing arm between a workpiece receiving position and a workpiece discharge position; and means connected between said means for moving and said means for reciprocating for synchronizing by a timed relation the operation of said means for reciprocating and said means for moving, said means for synchronizing includes a pivot shaft for supporting said actuating lever for pivotal movement on said swing arm whereby said moveable actuating lever pivots while carried by said swinging arm between a workpiece transfer site and a workpiece loading position.

14. The apparatus according to claim 13 wherein said means for moving the displaceable griper further includes a cam, a follower engageable with said cam while supported by one end of said actuating lever and the opposite end of said actuating lever is coupled to displace said moveable gripper.

15. Apparatus to load workpieces on a carrier for a decorator, said apparatus including the combination of:
    means for conveying a workpiece to a transfer site;
    gripper means including a displaceable gripper movable relative to a stationary gripper for supporting a workpiece at said transfer site;
    a swing arm supporting said gripper means at one end thereof for movement between said workpiece transfer site and a workpiece loading position;
    means including an actuating lever moveable with said swing arm for moving the displaceable gripper into a workpiece gripping position with the stationary gripper at said transfer site and for moving the displaceable gripper into a workpiece release position with said stationary gripper at said workpiece loading position, said means for moving include cam means for controlling said actuating lever while rotatably supported by said oscillator shaft for operating said moveable gripper;
    means joined to the end of said swing arm opposite said gripper means for reciprocating said swing arm between a workpiece receiving position and a workpiece discharge position, said means for reciprocating include a cam track, a follower engaged in said cam track and means for connecting said follower to said swing arm, said means for connecting including a pivot arm for supporting said follower and coupled to said oscillator shaft, and means for supporting said oscillator shaft for rotary movement; and
    means connected between said means for moving and said means for reciprocating for synchronizing by a timed relation the operation of said means for reciprocating and said means for moving.

16. Apparatus to load workpieces on a carrier for a decorator, said apparatus including the combination of:
    means for conveying a workpiece to a transfer site;
    gripper means including a displaceable gripper movable relative to a stationary gripper for supporting a workpiece at said transfer site;
    a swing arm supporting said gripper means at one end thereof for movement between said workpiece transfer site and a workpiece loading position;
    means including an actuating lever moveable with said swing arm for moving the displaceable gripper into a workpiece gripping position with the stationary gripper at said transfer site and for moving the displaceable gripper into a workpiece release position with said stationary gripper at said workpiece loading position;
    means joined to the end of said swing arm opposite said gripper means for reciprocating said swing arm between a workpiece receiving position and a workpiece discharge position;
    means connected between said means for moving and said means for reciprocating for synchronous by a timed relation the operation of said means for reciprocating and said means for moving; and
    said swing arm includes means for rotatably supporting said gripper means and wherein the apparatus further includes means coupled to said means for rotatably supporting said gripper means for rotating a workpiece supported by the gripper means from a first orientation to a second orientation while moved by the swing arm between said workpiece transfer site and said workpiece loading position.

17. A workpiece handling apparatus for a for a decorator, said apparatus including the combination of:
    means for conveying a workpiece to a transfer site;
    gripper means including a displaceable gripper movable for supporting a workpiece at said transfer site;
    a swing arm supporting said gripper means at one end thereof for movement between said transfer site and a workpiece conveying position;
    means including an actuating lever moveable with said swing arm for moving the displaceable gripper into a workpiece gripping position with the stationary gripper at said transfer site and for moving the displaceable gripper into a workpiece release position with said stationary gripper at said workpiece conveying position;
    means joined to the end of said swing arm opposite said gripper means for reciprocating said swing arm between a workpiece receiving position and a workpiece discharge position;
    means connected between said means for moving and said means for reciprocating for synchronizing by a timed relation the operation of said means for reciprocating and said means for moving, said means for synchronizing including a pivot for supporting said actuating lever for pivotal movement on said swing arm whereby said moveable actuating lever pivots while carried by said swinging arm between said transfer site and a workpiece loading position; and
    said swing arm includes means for rotatably supporting said gripper means and wherein the apparatus further includes means coupled to said means for rotatably supporting said gripper means for rotating a workpiece supported by the gripper means from a first orientation to a second orientation while moved by the swing arm between said workpiece transfer site and said workpiece loading position.

18. A workpiece handling apparatus for moving a workpiece from a first workpiece position to a second workpiece position, said apparatus including the combination of:
    means for conveying a workpiece to the first position;
    gripper means including at least a displaceable gripper movable for supporting a workpiece at said first workpiece position;
    a swing arm supporting said gripper means at one end thereof for movement of said workpiece at least between said first workpiece position and said second workpiece position;
    means including an actuating lever moveable with said swing arm for moving the displaceable gripper into a workpiece gripping position at said first workpiece position and for moving the displaceable gripper into a workpiece release position at said second workpiece position;
    means joined to the end of said swing arm opposite said gripper means for reciprocating said swing arm between a first swing arm position, when the workpiece is in the first workpiece position and a second swing arm position when said workpiece is in the second workpiece position;

means connected between said means for moving and said means for reciprocating for synchronizing, by a timed relation, the operation of said means for reciprocating and said means for moving, said means for synchronizing including a pivot for supporting said actuating lever for pivotal movement on said swing arm whereby said moveable actuating lever pivots while carried by said swinging arm between said first swing arm position and said second swing arm position; and said swing arm includes means for rotatably supporting said gripper means and wherein the apparatus further includes means coupled to said means for rotatably supporting said gripper means for rotating a workpiece supported by the gripper means from a first orientation to a second orientation while the workpiece moved by the swing arm between said first workpiece position and said second workpiece position.

* * * * *